United States Patent [19]

Thompson, III

[11] Patent Number: 5,377,550
[45] Date of Patent: Jan. 3, 1995

[54] MECHANICAL TORQUE INDICATOR

[75] Inventor: Parke H. Thompson, III, St. Louis, Mo.

[73] Assignee: Hubbell Incorporated, Orange, Conn.

[21] Appl. No.: 1,172

[22] Filed: Jan. 7, 1993

[51] Int. Cl.⁶ .............................................. G01L 3/02
[52] U.S. Cl. ............................ 73/862.322; 73/862.191
[58] Field of Search ................... 73/862.322, 862.321, 73/862.191, 862.25, 862.08, 151

[56] References Cited

U.S. PATENT DOCUMENTS

| | | | |
|---|---|---|---|
| 98,205 | 12/1869 | Sutton | 73/862.322 |
| 212,728 | 2/1879 | Morin et al. | 73/862.322 |
| 235,164 | 12/1880 | Mather | 73/862.322 |
| 2,573,640 | 10/1951 | Connors | 173/21 |
| 3,116,634 | 1/1964 | Grabovac | 73/862.08 |
| 3,367,426 | 2/1968 | Laverty | 173/21 |
| 3,379,052 | 4/1968 | Howard et al. | 73/81 |
| 3,386,284 | 6/1968 | Hejzlar | 73/862.08 |
| 3,437,156 | 4/1969 | Laverty | 173/1 |
| 3,691,826 | 9/1972 | Grabovac | 73/862.21 |
| 3,771,358 | 11/1973 | Yamano | 73/862.321 |
| 3,832,861 | 9/1974 | Jahnke et al. | 52/127.5 |
| 3,879,951 | 4/1975 | Green | 72/90 |
| 4,137,758 | 2/1979 | Rodland | 73/862.25 |
| 4,193,720 | 3/1980 | Machida | 73/862.322 X |
| 4,457,183 | 7/1984 | Westbrook | 73/862.322 |
| 4,509,375 | 4/1985 | Davis | 73/862.322 |
| 4,630,818 | 12/1986 | Saarinen | 482/64 |
| 4,808,976 | 2/1989 | Kiefer et al. | 340/665 |
| 4,907,461 | 3/1990 | Eto et al. | 73/862.322 |
| 5,058,438 | 10/1991 | Timtner | 73/862.322 |

FOREIGN PATENT DOCUMENTS 547654 8/1975 U.S.S.R. .

OTHER PUBLICATIONS

Chance, Anchor Tools, 4A-5, Nov. 1985.

Primary Examiner—Richard E. Chilcot, Jr.
Assistant Examiner—Elizabeth L. Dougherty
Attorney, Agent, or Firm—Hovey, Williams, Timmons & Collins

[57] ABSTRACT

A mechanical torque indicator apparatus for use in gauging and indicating the magnitude of torsional force exerted on a driven member by a torque drive member includes an elongated torsion member defining a longitudinal axis and having first and second axial ends. The torsion member is supported on the torque drive member so that torsion loading of the driven member is transmitted through the torsion member. The relative rotational displacement of the axial ends of the shaft is converted by the apparatus into bi-directional linear displacement carried out within a plane extending transverse to the axis. This linear displacement actuates an indicator mounted on the torsion member for providing an indication of the applied torque.

14 Claims, 2 Drawing Sheets

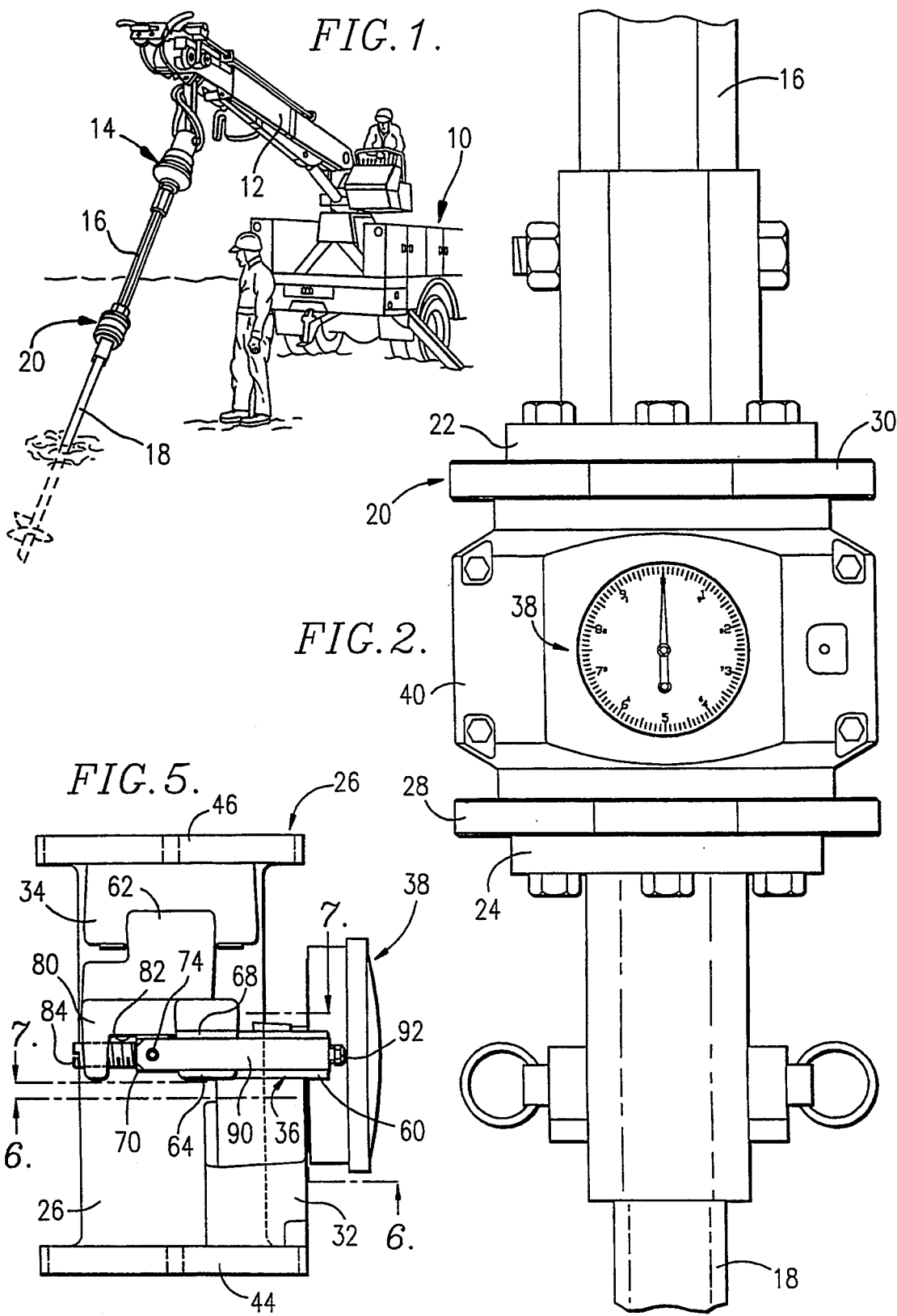

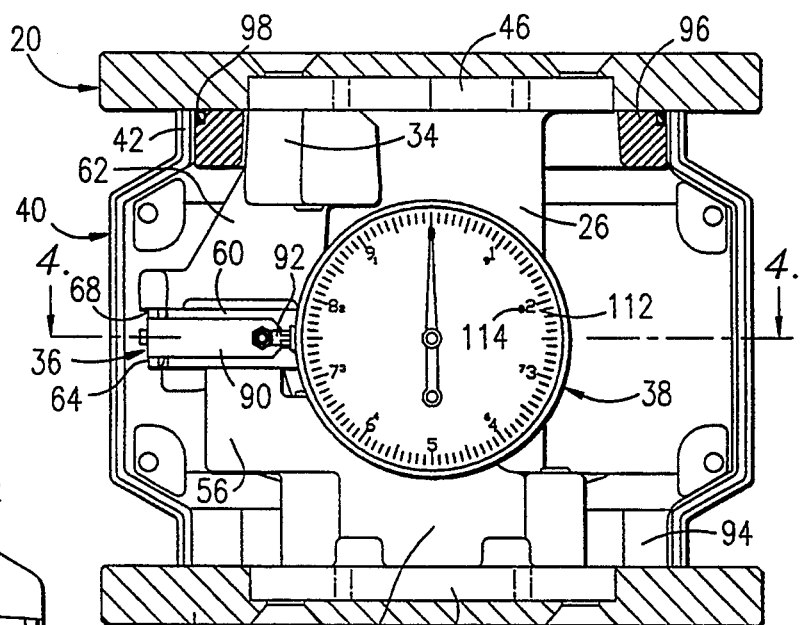
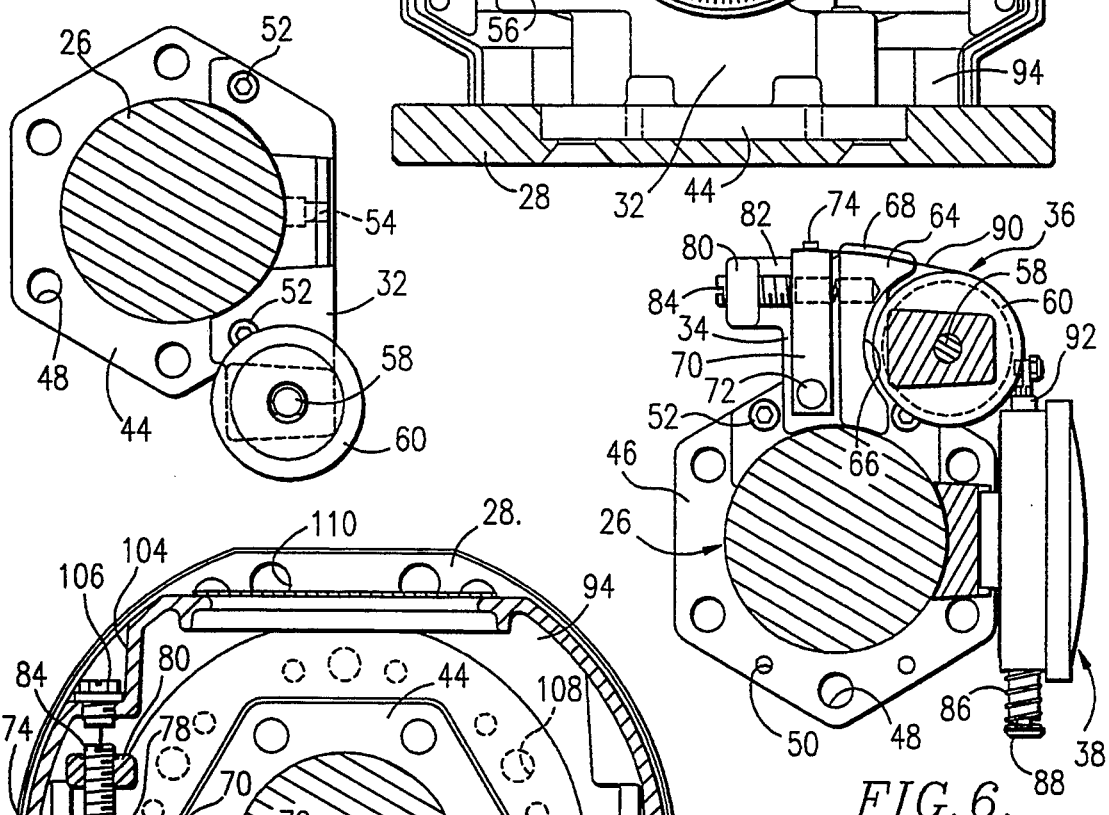
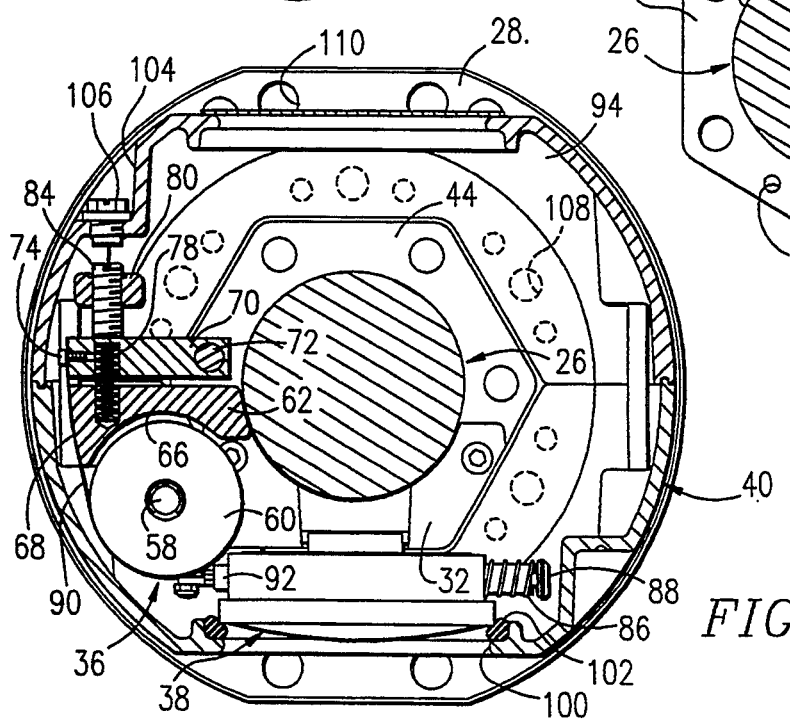

MECHANICAL TORQUE INDICATOR

BACKGROUND OF THE INVENTION

1. Field of the Invention

The present invention relates generally to torque indicators and, more particularly, to a mechanical torque indicator positionable between a pair of rotatable members and providing a visual indication of the magnitude of the torque.

2. Discussion of the Prior Art

In the installation of earth anchors, it is known to employ a hydraulic drive motor attached through a suitable installation torque head to an anchor installing tool in order to deliver a rotary driving force to the anchor installing tool. An anchor attached to an elongated rod is received within the anchor installing tool, and the anchor rotates with the tool. The anchor includes a helical load-bearing element which penetrates the earth as the anchor is rotated in order to position the anchor and rod at a desired depth beneath the surface of the ground.

There is a known relationship between the load-bearing capacity of an earth anchor and the torque with which the anchor is installed; specifically that as the torque required to install the anchor increases, the load-bearing capacity of the anchor to carry loads exerted on the rod to which the anchor is attached also increases. Thus, if the magnitude of the potential load to be carried by the anchor is known, then it is possible to install the anchor until the torque required to turn the anchor reaches a magnitude corresponding to the magnitude of the potential load.

In order to monitor the torque between an installation torque head and an anchor installing tool, and thus to gage the torque exerted on the anchor being installed by the tool, it is conventional to position a torque indicator between the torque head and tool. An example of a known type of torque indicator is a shear pin torque indicator which includes a pair of axially aligned cylindrical disks which are movable relative to one another. One of the disks is fastened to the torque head and the other to the installing tool, and one or more shear pins are placed between the two disks in order to prevent the disks from rotating relative to one another until the torque experienced by the disks is sufficient to shear the pins. After shearing of the pins, the indicator becomes "free wheeling" to prevent the anchor from being driven deeper.

By controlling the number of shear pins used in a shear pin torque indicator, it is possible to set the magnitude of torque at which installation of the anchor is considered complete.

Another known type of torque indicator is a hydraulic indicator which includes a hydraulic load cell interposed between a pair of disks such that the torque experienced by the disks causes a change of pressure within the load cell which is represented by a visible gauge mounted on the indicator.

Another known type of torque indicator is illustrated in U.S. Pat. No. 4,808,976, to Kiefer et al., and includes a pair of spaced cylindrical elements and a contact support connected with each of the elements. Each of the supports is provided with a contact that is spaced from the contact on the other support by a predetermined distance while the elements are free of torsional load. When torque is applied to the elements, the contacts move relative to one another, and when a preset magnitude of torque is reached, the contacts close a circuit including an audible alarm.

OBJECTS AND SUMMARY OF THE INVENTION

It is an object of the present invention to provide a mechanical torque indicator of unitary construction which is lightweight, preferably less than 40 pounds, in order to be easily positionable between a drive member and a driven member for gauging torque exerted on the driven member and indicating the magnitude of the torque.

It is another object of the present invention to provide a self-contained mechanical torque indicator operable in either direction of rotation of the drive member over a range of torques of between 0 and 30,000 lbs.-ft.

In accordance with these and other objects evident from the following description of a preferred embodiment of the invention, a mechanical torque indicator apparatus is provided for use on a rotatable drive wrench. The apparatus includes an elongated torsion member defining a longitudinal axis and having first and second axial ends, wherein the ends of the member are displaced rotationally relative to one another upon application of a torque about the axis, the distance of rotational displacement of the ends relative to one another corresponding to the applied torque.

The apparatus also includes a mounting means for supporting the torsion member on the drive wrench so that torsion loading of the wrench is transmitted through the torsion member, and a mechanical displacement conversion means is supported on the torsion member for converting the relative rotational displacement of the axial ends of the shaft into linear displacement carried out within a plane extending transverse to the axis. The linear displacement is used to shift a bidirectional indicator for providing an indication of the applied torque.

By providing this construction, numerous advantages are achieved. For example, by providing a unitary mechanical apparatus capable of being supported directly on the drive wrench, installation and removal of the apparatus is simplified, and the need for additional hardware, such as power supplies, transmitters, receivers, or electrical strain gauges, is obviated.

In addition, the construction of the present invention allows measurement of torque exerted in either rotational direction of the drive wrench in order to provide an indication of both installation and removal torques without requiring manipulation or replacement of the apparatus.

As described more fully below, the preferred means for providing an indication of the torque is constructed in such a manner as to reduce vibration and hysteresis within the apparatus.

BRIEF DESCRIPTION OF THE DRAWING FIGURES

A preferred embodiment of the present invention is described in detail below with reference to the attached drawing figures, wherein:

FIG. 1 is perspective view of a truck used in the installation of earth anchors, illustrating an anchor installation operation;

FIG. 2 is a side elevational view of a mechanical torque indicator constructed in accordance with a preferred embodiment of the present invention, illustrating the manner in which the apparatus is supported between a drive member and a driven member;

FIG. 3 is a side sectional view of the mechanical torque indicator apparatus;

FIG. 4 is a sectional view taken along line 4—4 of FIG. 3;

FIG. 5 is side elevational view of the torsion member of the preferred apparatus, illustrating the manner in which various components of the apparatus are supported on the member;

FIG. 6 is a sectional view taken along line 6—6 of FIG. 5;

FIG. 7 is a sectional view taken along line 7—7 of FIG. 5.

DETAILED DESCRIPTION OF THE PREFERRED EMBODIMENT

Turning first to FIG. 1, the equipment used for installing an earth anchor is illustrated as including a truck 10 provided with a boom 12 having a hydraulic motor 14 supported from one end thereof. The hydraulic motor is positionable and operable from a control panel on the truck, and delivers a rotary output that is transmitted through a drive member or kelly bar 16, and a driven member or drive wrench 18. Typically, the average speed of the rotary output of the hydraulic motor is between 10-15 rpm.

A torque indicator 20 constructed in accordance with a preferred embodiment of the present invention is secured between the drive member 16 and the driven member 18. As shown more clearly in FIG. 2, the torque indicator is attached to the drive member by an adapter 22 that is secured to the drive member and to the apparatus. A similar adapter 24 is used to secure the torque indicator to the driven member 18.

As shown in FIG. 3 the torque indicator 20 includes an elongated torsion member 26 defining a longitudinal axis and having first and second axial ends on which generally circular mounting plates 28, 30 are supported. A pair of brackets 32, 34 are supported between the ends of the torsion member, and are movable relative to one another about the axis of the torsion member upon application of a torque to the member in either rotational direction.

A mechanical displacement conversion means 36 is supported by and between the brackets for converting the relative rotational displacement of the brackets into linear displacement which is carried out within a plane extending transverse to the longitudinal axis. An indicator assembly 38 is mounted on the bracket 32 for providing an indication of the strain experienced by the torsion member 26, and is actuated in response to the linear displacement of the mechanical displacement conversion means.

A casing 40 is attached to the mounting plate 28 and includes a free end 42 disposed adjacent the opposing mounting plate 30 in order to define an interior space within which the displacement conversion means and the indicator assembly are disposed.

The torsion member 26 is shown removed from the casing in FIGS. 5-7 and, as shown in FIG. 5, includes an elongated body preferably formed of a homogenous material which behaves in a predictable manner when submitted to torsional loading about the longitudinal axis thereof. The member 26 preferably extends substantially the entire length of the apparatus in order to permit the member to handle the largest possible amount of deflection before failure. In this manner, it is possible for the member to withstand torques up to and in excess of 30,000 lbs.-ft., while providing a maximum amount of deflection. Preferably, the total amount of deflection includes a range of approximately 0.090 inches in either rotational direction. This allows a more accurate measurement of the torque to be made than where a smaller range of movement is possible.

In addition to being designed to handle the high torque loads experienced during the installation of an earth anchor or the like, the torsion member is also designed to withstand axial loads of up to 40,000 lbs. in order to prevent failure where compressive forces are transmitted through the drive wrench to the anchor being installed. A preferred material for use as the torsion member is a tool steel which possesses high shock resistance.

The intermediate portion of the torsion member is cylindrical, and the member is formed with hexagonal flanges 44, 46 at the axial ends thereof, as shown in FIGS. 6 and 7. Each of the flanges 44, 46 includes a plurality of axially extending holes 48, 50 through which the torsion member is attached to the mounting plates 28, 30 and the brackets 32, 34.

As best shown in FIG. 7, the first bracket 32 is supported on the first flange 44 of the torsion member 26 by a pair of threaded connectors 52, and extends axially of the torsion member toward the opposing flange 46. Because the bracket 32 is attached to the torsion member only at the flange 44, the bracket 32 moves freely with the flange 44 relative to the opposing flange 46 when the torsion member experiences strain due to torque exerted about the longitudinal axis. A transverse hole 54 is formed in the first bracket for permitting attachment of the indicator thereto.

Turning to FIG. 3, the first bracket also includes an axially extending arm 56 on which an idler roller 60 is supported. As shown in FIG. 7, the arm is provided with an axle 58 on which the idler roller 60 is supported for rotation. The axle 58 extends in a direction parallel to the longitudinal axis of the torsion member, and the idler roller is retained on the axle by a conventional means.

The second bracket 34 is shown in FIG. 6, and is supported on the second flange 46 of the torsion member 26 by a pair of threaded connectors 52, and extends axially of the torsion member toward the opposing flange 44. Because the second bracket 34 is attached to the torsion member only at the flange 46, the bracket moves freely with the flange 46 relative to the opposing flange 44 when the torsion member experiences strain due to torque exerted about the longitudinal axis.

Therefore, strain experienced by the torsion member results in relative rotational movement between the brackets 32, 34, wherein the brackets move in a first rotational direction relative to one another when torque is applied in a first direction, and in the opposite rotational direction when torque is applied in the opposite direction.

The second bracket 34 is formed with an axially extending leg 62, as shown in FIG. 3, including a free end 64 axially aligned with and laterally spaced from the idler roller 60. Turning to FIG. 6, the free end includes a concave recess 66 having an arcuate surface of a radius slightly greater than the radius of the idler roller 60 and receives the roller so that the roller and the leg 62 of the bracket 34 are partially overlapped when viewed in the direction of the longitudinal axis of the torsion member. An arcuate guide surface 68 is also provided on the free end of the bracket at a position radially outward of the recess and in close proximity to the outer circumference of the roller 60. The arcuate guide surface 68 is a circular arc segment formed about an axis collinear with the longitudinal axis of the torsion member 26.

A support arm 70 is attached to the second bracket 34 adjacent the free end of the bracket, and is pivotable about a pivot pin 72 provided on the bracket 34 and extending in a direction parallel to the longitudinal axis of the torsion member. As shown in FIG. 4, the support arm 70 is provided with a recess in the free end thereof within which a threaded fastener 74 is received.

Both the free end 64 of the bracket 34 and the support arm 70 include opposing transverse bores within which a compression spring 78 is disposed. In addition, as shown in FIG. 5, the second bracket 34 includes an L-shaped arm 80 having an elongated portion extending in a direction transverse to the longitudinal axis of the member and a short portion depending therefrom. A channel 82 is defined between the depending portion and the free end of the bracket, within which the support arm 70 is disposed. The depending portion includes a transverse threaded hole within which an adjustment screw 84 is provided. The adjustment screw is threaded into the hole by a distance sufficient to engage the support arm and limit the range of movement of the arm relative to the free end of the bracket.

The indicator assembly 38 is illustrated in FIG. 3, and includes a dial indicator provided with bi-directional numerical indicia representative of the torque that is applied to the apparatus in order to achieve the strain measured. An exemplary device is a commercially available, full jeweled Federal E5M 0.0005 inch, 0 to 30,000 lbs.-ft. device. However, any conventional type of indicator assembly may be used. It is noted that mechanical devices are preferred in that such devices require no batteries or external circuitry in order to operate properly, and do not require the level of up keep necessitated by the use of electronic or hydraulic components.

The indicator assembly includes an actuator 92 which is movable along a bi-directional straight line path. The actuator transmits linear movement of the mechanical displacement conversion means to the rotational input for a needle provided on the indicator. A compression spring 86 is held on the linear actuator 92 between the body of the indicator and an end plate 88 of the actuator so that the spring 86 urges the actuator toward the right, as shown in FIG. 4.

A flexible tension member 90 includes a first end connected by a clevis connection to the linear actuator 92 and a second end held to the support arm 70 by the threaded fastener 74. Preferably, the tension member 90 is formed of a flexible stainless steel belt having a thickness of between 0.002 and 0.003 inches. The belt extends between the linear actuator and the support arm and normally engages both the idler roller and the guide surface.

Although a belt is illustrated in the preferred embodiment, it is possible to employ any suitable substitute in place of the belt as a tension member for transferring tensile loads between the second bracket 34 and the actuator 92. For example, a filament or cable formed of either plastic or metallic material could be used.

Turning to FIG. 2, the casing 40 is formed of two substantially identical halves which are held together by a plurality of fasteners extending therebetween. As shown in FIG. 3, an inner annular ring 94 is formed in the casing and is attached to the first mounting plate 28 by threaded fasteners. The free end 42 of the casing rests in close proximity to the second mounting plate 30, but is not fastened thereto.

An annular ring 96 is secured to the mounting plate 30 by threaded fasteners and is sized to be received within and in engagement with the inner circumferential surface of the free end of the casing. The annular ring 96 includes a groove in the outer circumferential surface thereof within which an O-ring 98 of resilient material is disposed. The casing engages the O-ring 98 when assembled and a seal is provided which prevents debris from entering the interior space of the apparatus.

A transverse opening 100 is provided in at least one half of the casing in order to permit a reading to be made of the indicator 38. An O-ring 102, preferably formed of closed-cell neoprene or the like, is compressed between the casing and the indicator, and serves to seal the opening from exposure to debris. In addition, the O-ring 102 dampens vibration of the apparatus during operation.

Turning to FIG. 4, a small notch 104 is formed in the casing, and a threaded transverse hole extends through the casing within the notch in alignment with the adjustment screw 84. A threaded plug 106 is received in this hole and is removable to permit access to the adjustment screw. Preferably, the plug is plastic, although other materials may be used.

Each mounting plate 28, 30 is formed with a hexagonal recess in the inner face thereof, which is adapted to receive one of the flanges 44, 46 of the torsion member 26. By providing this corresponding shape for both the flanges and the mounting plates, rotational forces exerted on the mounting plates by the drive member and driven member are transmitted to the torsion member.

The mounting plates 28, 30 are also each provided with inner and outer sets of threaded through holes 108, 110 adapted to permit connection of the apparatus with either of two different sizes of drive members. Preferably, the inner annular ring 94 of the casing and the annular ring 96 provided on the mounting plate 30 are both provided with axially extending recesses aligned with the inner set of threaded holes 108 so that when bolts are threaded through the adapters 22, 24 into the mounting plates 28, 30, the bolts are free to pass through the holes into the recesses without being exposed to the interior space defined by the casing 40.

During use, as shown in FIG. 2, the apparatus is connected between the kelly bar 16 and drive wrench 18 of an installation device by positioning one axial end of the apparatus against the adaptor 22 of the kelly bar, and threading bolts into the corresponding set of holes in the mounting plate located adjacent the adaptor. The opposite mounting plate is secure to the adaptor of the drive wrench in an identical manner.

Because the torsion member 26 is attached to the mounting plates 28, 30 and each end of the torsion member is secured against rotational movement relative to the mounting plate attached thereto, torque applied by the kelly bar to the drive wrench is transmitted through the torsion member, causing the torsion member to experience strain or twisting about the longitudinal axis thereof.

The first bracket 32, along with the indicator assembly 38 and the idler roller 60, moves with the flange 44 connected to the drive wrench, while the second bracket 34 moves with the flange 46 attached to the kelly bar 16. Because the tension member 90 is attached to the second bracket 34 through the support arm 70, it moves with the second bracket 34 and is followed by the linear actuator 92.

For example, as viewed in FIG. 4, when a torque is applied to the torsion member in the clockwise direction, the second bracket 34 rotates in the clockwise direction, tensioning the belt 90 and pulling the actuator to the left. The compression spring 78 between the free end 64 of the second bracket 34 and the support arm 70 is 2-4 lbs. stronger than the compression spring 86 on the linear actuator 92 such that the support arm is normally held against the adjustment screw 84 during operation of the apparatus in either direction. However, the spring 86 is strong enough to move the actuator 92 to the right as the second bracket 34 moves back in the counterclockwise direction toward the first bracket 32.

Although the actuator 92 is confined to linear movement while the bracket 34 moves in a circular path around the longitudinal axis of the torsion member, it is possible to accurately transmit rotational movement of the bracket to the actuator by guiding the belt 90 around the roller 60 and over the guide surface 68. As mentioned, the linear actuator is movable along a line tangent to the circumference of the roller such that tensioning of the belt 90 pulls on the actuator 92 only within the line along which the actuator is movable.

In addition, because the guide surface 68 is a circular arc segment formed about the axis of the torsion member 26, relative movement between the free end of the second bracket 34 and the roller, within the range of allowable strain of the torsion member 26, causes the belt 90 to be pulled across the roller along a line that is substantially tangent to the roller at the same point on the circumference of the roller throughout the range of relative movement. Thus, the relative rotational movement between the brackets 32, 34 is accurately converted into linear movement of the actuator.

Prior to operation of the device, the plug 106 is removed and the adjustment screw 84 is properly positioned relative to the second bracket 34 to provide a zero reading on the indicator when the apparatus is unloaded. Thereafter, the plug is replaced.

As mentioned with reference to FIG. 4, application of a clockwise torque causes relative movement between the first and second brackets away from one another such that the belt 90 is tensioned and pulls the actuator 92 to the left.

If the anchor being installed under application of such a torque encounters a rock or hard substrate, the torque quickly builds to a peak until the anchor passes the rock. Typically, the torque on the drive wrench drops almost instantly once the anchor clears the rock, and the brackets 32, 34 jerk quickly back toward one another. However, the linear actuator 92 is shielded somewhat from this jerking movement since the belt is flexible and thus free to bow and lift off of the guide surface 68 and roller 60 when such motion occurs.

During less rapid movement of the second bracket 34 in the counterclockwise direction toward the first bracket, e.g. either when a clockwise torque is released or a counterclockwise torque is applied to the flange relative to the opposing flange, the compression spring 86 on the linear actuator maintains tension on the belt and pulls the actuator to the right so that an accurate indication of the torque is displayed at all times.

If this counterclockwise movement of the second bracket relative to the first bracket occurs because of the application of a torque in the counterclockwise direction, movement of the linear actuator 92 causes the indicator to display a torque value by rotating in the opposite direction as when a clockwise torque is applied. For example, as shown in FIG. 3, an outer set of numerical indicia 112 are applicable for indicating clockwise torque while an inner set of indicia 114 provide torque information for when the apparatus is twisted in the opposite direction.

If, during installation of an anchor in the counterclockwise direction, the anchor encounters a rock or the like, the torque quickly builds to a peak until the rock is passed. Thereafter, the brackets 32, 34 jerk quickly away from one another. However, the linear actuator 92 is partially shielded from this jerking movement since the spring 78 dampens the movement.

Although the invention has been described with reference to the preferred embodiment illustrated in the attached drawing figures, substitutions and equivalents may be used herein without departing from the scope of the invention as recited in the claims.

What is claimed is:

1. A mechanical torque indicator apparatus for use on a rotatable drive wrench, the apparatus comprising:
    an elongated torsion member defining a longitudinal axis and having first and second axial ends, the ends of the member being displaced rotationally relative to one another upon application of a torque about the axis, wherein the distance of rotational displacement of the ends relative to one another corresponds to the applied torque;
    a mounting means for supporting the torsion member on the drive wrench so that torsion loading of the wrench is transmitted through the torsion member;
    a first radial arm connected to one end of the member and a second radial arm connected to the opposing end of the member, the first and second radial arms moving relative to one another about the axis of the member when torsional strain is experienced by the member;
    a mechanical displacement conversion means supported on the torsion member for continuously converting the relative rotational displacement of the radial arms into linear displacement carried out within a plane extending transverse to the axis; and
    an indicator mounted on the torsion member for continuously providing an indication of the magnitude of the applied torque in response to the linear displacement of the mechanical displacement conversion means.

2. The apparatus as recited in claim 1, wherein the torsion member is formed with a flange at each axial end thereof, the mechanical displacement means and the indicator being supported by and between the flanges.

3. The apparatus as recited in claim 2, further comprising a first bracket supported on a first of the flanges and a second bracket supported on the second flange, the displacement conversion means and the indicator being supported on the brackets.

4. A mechanical torque indicator apparatus for use on a rotatable drive wrench, the apparatus comprising:
    an elongated torsion member defining a longitudinal axis and having first and second axial ends and a flange formed at each axial end, the ends of the member being displaced rotationally relative to one another upon application of a torque about the axis, wherein the distance of rotational displacement of the ends relative to one another corresponds to the applied torque;

a mounting means for supporting the torsion member on the drive wrench so that torsion loading of the wrench is transmitted through the torsion member, the mounting means including a pair of circular mounting plates supported at the axial ends of the torsion member, wherein each mounting plate includes a first attachment means for permitting attachment of the plate to one flange of the torsion member, and a second attachment means for permitting attachment of the plate to the drive wrench;

a mechanical displacement conversion means supported on the torsion member for converting the relative rotational displacement of the axial ends of the shaft into linear displacement carried out within a plane extending transverse to the axis; and an indicator mounted on the torsion member for providing an indication of the applied torque in response to the linear displacement of the mechanical displacement conversion means, the mechanical displacement means and the indicator being supported by and between the flanges.

5. The apparatus as recited in claim 4, wherein each flange includes a non-circular cross-sectional shape, each mounting plate including a recess having a shape corresponding to the cross-sectional shape of the flanges.

6. The apparatus as recited in claim 4, further comprising a hollow cylindrical casing attached to a first of the mounting plates and having a free end disposed adjacent the second mounting plate in order to define an interior space within which the displacement conversion means and the indicator are disposed.

7. The apparatus as recited in claim 6, wherein the second mounting plate includes an annular seat that engages the free end of the casing, the apparatus further comprising a sealing ring between the seat and the free end of the casing for substantially closing off the interior space.

8. The apparatus as recited in claim 6, wherein the casing includes an opening through which the indicator is visible from outside the apparatus.

9. The apparatus as recited in claim 8, further comprising a sealing ring pressed between the indicator and the casing around the periphery of the opening in the casing.

10. A mechanical torque indicator apparatus for use on a rotatable drive wrench, the apparatus comprising:

an elongated torsion member defining a longitudinal axis and having first and second axial ends and a flange formed at each axial end, the ends of the member being displaced rotationally relative to one another upon application of a torque about the axis, wherein the distance of rotational displacement of the ends relative to one another corresponds to the applied torque;

a mounting means for supporting the torsion member on the drive wrench so that torsion loading of the wrench is transmitted through the torsion member;

a mechanical displacement conversion means supported on the torsion member for converting the relative rotational displacement of the axial ends of the shaft into linear displacement carried out within a plane extending transverse to the axis;

an indicator mounted on the torsion member for providing an indication of the applied torque in response to the linear displacement of the mechanical displacement conversion means, the mechanical displacement means and the indicator being supported by and between the flanges; and a first bracket supported on a first of the flanges and a second bracket supported on the second flange, the displacement conversion means and the indicator being supported on the brackets, wherein the indicator is supported on the first bracket and includes an actuator and means for guiding the actuator for bi-directional linear movement within a plane transverse to the longitudinal axis of the torsion member.

11. The apparatus as recited in claim 10, wherein the mechanical displacement conversion means includes an idler roller supported on the first bracket for rotation about an axis parallel to the longitudinal axis of the torsion member, and a flexible tension member extending at least partially around the idler roller and having a first end connected to the actuator and a second end connected to the second bracket, the idler roller including a circumferential surface which is tangent to the linear direction of movement of the actuator.

12. The apparatus as recited in claim 11, further comprising an adjustment means for adjusting the position of the point of attachment of the tension member to the second bracket.

13. The apparatus as recited in claim 12, wherein the adjustment means includes a support arm attached to the second bracket for pivotal movement about an axis extending in a direction parallel to the longitudinal axis of the torsion member, a securing means for securing the second end of the tension member to the support arm, a first spring for biasing the support arm in a first direction tensioning the tension member, and an adjustable stop for limiting movement of the support arm in the first direction.

14. The apparatus as recited in claim 13, further comprising a second spring for biasing the actuator in a second direction tensioning the tension member, wherein the first spring is sized to apply a greater force on the tension member than the second spring, and the second spring is sized to maintain tension of the tension member during rotational movement of the second bracket in the second direction relative to the first bracket.

* * * * *